United States Patent
Weigelt

(10) Patent No.: US 12,184,228 B2
(45) Date of Patent: Dec. 31, 2024

(54) KIT OF PARTS FOR A SOLAR MODULE SYSTEM, METHOD FOR PRODUCING A SOLAR MODULE SYSTEM, AND USE OF A SPACER

(71) Applicant: HANWAH Q CELLS GmbH, Bitterfeld-Wolfen (DE)

(72) Inventor: Uwe Weigelt, Bitterfeld-Wolfen (DE)

(73) Assignee: Hanwha Q CELLS GmbH, Bitterfeld-Wolfen (DE)

( * ) Notice: Subject to any disclaimer, the term of this patent is extended or adjusted under 35 U.S.C. 154(b) by 540 days.

(21) Appl. No.: 17/441,158

(22) PCT Filed: Mar. 18, 2020

(86) PCT No.: PCT/DE2020/100214
§ 371 (c)(1),
(2) Date: Oct. 4, 2021

(87) PCT Pub. No.: WO2020/187369
PCT Pub. Date: Sep. 24, 2020

(65) Prior Publication Data
US 2022/0166376 A1    May 26, 2022

(30) Foreign Application Priority Data

Mar. 20, 2019 (DE) .......................... 102019107095.3

(51) Int. Cl.
*H02S 40/36* (2014.01)
(52) U.S. Cl.
CPC ..................................... *H02S 40/36* (2014.12)
(58) Field of Classification Search
None
See application file for complete search history.

(56) References Cited

U.S. PATENT DOCUMENTS

| 2010/0065108 | A1* | 3/2010 | West | H02S 20/23 |
| | | | | 136/251 |
| 2011/0220180 | A1* | 9/2011 | Cinnamon | H02S 30/10 |
| | | | | 136/251 |

(Continued)

FOREIGN PATENT DOCUMENTS

| DE | 10 2012 102 214 B3 | 2/2013 |
| KR | 101245167 B1 | 3/2013 |

OTHER PUBLICATIONS

Hugo Brennenstuhl GmbH & Co. Kommanditgellschaft "Safe Box Big IP44 | Schutzkapsel für Kabel in Außenbereich (Sicherheitsbox für Stecker, zusäzlicher Schutz für Kleinkinder)," Feb. 10, 2019 (10 pages), retrieved from the internet: https ://web.archive.org/web/20190210233301/https://www .brennenstuhl.com/deDE/produkte/ersatzteile-und-zubehoer/safe-box-big-ip44.

*Primary Examiner* — Krystal Robinson
(74) *Attorney, Agent, or Firm* — Christensen, Fonder, Dardi & Herbert PLLC

(57) ABSTRACT

A kit comprising a solar module having a positive-pole cable comprising a positive pole plug, and a negative pole cable comprising a negative-pole plug, a spacer. The spacer comprises a first flat part spanning a first flat part plane together with first flat part outer edges, and a further flat part spanning a further flat part plane together with further flat part outer edges. The first flat part has fixing means and/or the further flat part has further fixing means. The first flat part and the further flat part configured to be mounted on one another such that the first flat part plane is arranged at a fixing angle to the further flat part plane and forms, between the first flat part plane and the further flat part plane, a plug recess located a distance from the first flat part outer edges and the further flat part outer edges.

17 Claims, 5 Drawing Sheets

(56) References Cited

U.S. PATENT DOCUMENTS

| | | | |
|---|---|---|---|
| 2012/0125395 A1* | 5/2012 | Bellacicco | H01L 31/02008 136/244 |
| 2012/0125410 A1* | 5/2012 | West | H02S 20/23 403/294 |
| 2012/0298188 A1* | 11/2012 | West | F24S 25/61 136/251 |
| 2013/0039028 A1* | 2/2013 | Korman | H02S 40/32 361/829 |
| 2013/0140416 A1* | 6/2013 | West | F24S 25/20 248/231.81 |
| 2017/0194901 A1* | 7/2017 | Seliger | H01L 31/02013 |
| 2018/0019703 A1* | 1/2018 | Almy | H02S 30/10 |

* cited by examiner ent entry of PCT
KIT OF PARTS FOR A SOLAR MODULE SYSTEM, METHOD FOR PRODUCING A SOLAR MODULE SYSTEM, AND USE OF A SPACER

RELATED APPLICATIONS

The present application is a National Phase entry of PCT Application No. PCT/DE2020/100214, filed Mar. 18, 2020, which claims priority to German Patent Application No. 10 2019 107 095.3, filed Mar. 20, 2019, the disclosures of which are hereby incorporated by reference herein in their entirety.

FIELD OF THE INVENTION

The invention relates to a kit of parts for a solar module system, to a method for producing a solar module system, and to a use of a spacer in such a solar module system. In particular, the invention relates to a kit of parts which contains a spacer and is suitable for producing a solar module system, to a method for producing such a solar module system using the kit of parts, and to a use of the spacer in such a solar module system.

BACKGROUND OF THE INVENTION

A solar module system is usually constructed from a plurality of solar modules which are electrically connected to one another. For this purpose, the solar modules each have a positive pole cable with a positive pole plug, and a negative pole cable with a negative pole plug. The electrical connection of the solar modules is achieved by means of a plug connection between a positive pole plug of a solar module and a negative pole plug of a further solar module.

According to prior art not evidenced in documentary form, the positive pole and negative pole cables can be fastened on the solar module by means of a plastic clip. However, this clip is relatively difficult to fasten. Moreover, its durability is not permanent since the fastening is based on a clamping effect, and plastic which is exposed to UV light over years and decades of use in the field loses its elasticity and breaks.

In addition, owing to the requirement to save material, it may happen that the cables are too short to be able to be fastened on a solar module frame of the solar module. Another convenient way of permanently placing the cables of the interconnected solar modules is to place the plugs on an underlying surface on which the solar modules are also permanently mounted. This approach is opposed by the fact that the positive pole and negative pole plugs must not be permanently in contact with water, as may be the case, for example, due to puddles on the ground, since this can lead to undesirable electrical insulation faults in the entire solar module system.

SUMMARY

It is therefore an object of the invention to provide means which ensure that the positive pole plugs and the negative pole plugs of an installed solar module system are positioned permanently away from such puddles on the ground.

According to the invention, the object is achieved by a kit of parts having the features of patent claim 1, a method having the features of patent claim 12 and a use having the features of patent claim 14.

For this purpose, the kit of parts has a spacer with a first flat part and a further flat part which, in an unassembled state, are designed to save space and, at the same time, can be easily assembled without tools in such a way that, in the assembled state, when used in the solar module system, the spacer ensures a predetermined distance between the underlying surface on which the solar modules are permanently mounted and the plug connection comprising the positive pole plug and the negative pole plug. For this purpose, the first flat part spans a first flat part plane with first flat part outer edges, and the further flat part spans a further flat part plane with further flat part outer edges. Furthermore, the first flat part has fixing means and/or the further flat part has further fixing means, the first flat part and the further flat part can be mounted on one another in such a way that the first flat part plane is arranged at a fixing angle to the further flat part plane and a plug recess which is at a distance from the first flat part outer edges and the further flat part outer edges is formed between the first flat part plane and the further flat part plane to receive the plug connection between the positive pole plug and the negative pole plug of the solar modules.

The invention prevents plug connections of the solar module system from being in direct contact with an underlying surface such as the earth or a roof surface. This prevents the plug connection from being permanently exposed to dirt and water accumulations. The electrical safety and the longevity of the solar module and accordingly of the solar module system are thereby increased. Owing to the fact that the spacer can be assembled by arranging the first flat part and the further flat part at a fixing angle with respect to one another by means of fixing means, the desired effect is achieved with a comparatively low outlay on materials. Regions of the spacer which are located between the first flat part and the further flat part and are in each case at a distance from the first flat part outer edges and the further flat part outer edges are regarded as plug recesses in the sense according to the invention. Having been laid on a deposition surface such as the ground or a roof surface by means of its first flat part outer edges and its further flat part outer edges, the spacer comes into contact with said ground or roof surface. The plug recess with the plug connection consisting of the positive pole plug and the negative pole plug located in the plug recess is then at a distance from the deposition surface because the first flat part outer edges and the further flat part outer edges are arranged at a distance from the plug recess. In order to ensure this desired spacing of the plug connection from the deposition surface, it is necessary for the first flat part and the further flat part to have such a size in relation to the extent of the positive pole plug and the negative pole plug that the plug connection formed from the positive pole plug and the negative pole plug and fastened in the plug recess is positioned at a distance from the first flat part outer edges and the further flat part outer edges.

If required, the spacer can be assembled in the manner described above and, in the assembled state, acts in a solar module system as a spacer which ensures a predetermined distance between the plug connection arranged on it and the underlying surface on which the solar modules stand. By fixing the first flat part to the further flat part, the spacer can stand on an underlying surface in a region of the first flat part outer edge and/or a region of the further flat part outer edge, while other first flat part outer edges and other further flat part outer edges project into the air. Even if the spacer together with the plug connection arranged on it move when used in the solar module system, with the result that it comes to rest on different regions of the first and/or further flat part outer edges than before, it is ensured that the plug connection is away from the underlying surface by means of the predetermined distance. The predetermined distance is preferably equal to or greater than 0.2 cm, more preferably 0.5 cm, even more preferably 1.0 cm.

The kit of parts forming part of the invention for a solar module system represents a modular system for producing a solar module system. This modular system can be assembled on site.

The spacer preferably consists of the first flat part and the further flat part. No further parts are required to provide the functionality of the spacer. In an unassembled state, the spacer requires little space and can thus be easily packaged.

In the assembled state, the spacer preferably has a spherical outer contour when the first flat part outer edges and the further flat part outer edges are joined together in the imagination. This means that the first flat part and/or the further flat part are preferably of disk-shaped design and have, with their outer edges, a circular or ellipsoidal shape.

In a preferred embodiment, the fixing angle between the first flat part plane and the further flat part plane is in the range of from 75 to 90°. The fixing angle is more preferably in the range of from 80 to 90°. The fixing angle is even more preferably in the range of from 85 to 90°. The closer the fixing angle is to 90°, the larger the plug recess. The closer the fixing angle is to 90°, the rounder the spherical shape of the outer contour of the spacer formed by the imaginary joining of the first and further flat part outer edges appears.

The fixing means and/or the further fixing means are preferably designed as mechanical connecting means. It is advantageous if they are designed to form a positive connection. Simple assembly of the spacer consisting of the first flat part and the further flat part is thereby furthermore ensured.

In a preferred embodiment, the fixing means of the first flat part are designed as a slot which is designed in such a way that it fits around a section of the further flat part in an assembled state of the spacer. As an alternative or in addition, the further fixing means of the further flat part are likewise designed as a slot which is designed in such a way that it fits around a section of the first flat part in an assembled state of the spacer. Simple, easy and permanent fixing of the two flat parts is thereby achieved without tools and without additional components. The two flat parts can be permanently fixed on one another by simply plugging them into one another.

The flat part and the further flat part are preferably of identical design. This results in a cost advantage in mass production.

In a preferred embodiment, the first flat part is of axially symmetrical design in its first flat part plane. As an alternative or in addition, the further flat part is likewise of axially symmetrical design in its further flat part plane. If the flat parts have a round outer contour, the formation of a spherical shape of the spacer when the first flat part outer edges and the further flat part outer edges are joined in the imagination is thereby achieved. Alternatively, the first flat part outer edges and the further flat part outer edges can also have a square or a rectangular shape. This would result in a cubic or cuboidal outer shape of the spacer.

In a preferred embodiment, the kit of parts furthermore has fastening means or a fastening structure. The fastening means are designed to permanently fasten the positive pole plug or the negative pole plug on the spacer in a state in which said means are fastened on the spacer. The corresponding plug can thereby furthermore be secured on the spacer. Moreover, this furthermore ensures that the corresponding plug remains at a location provided for it in the plug recess, even if the spacer changes its position because it rotates as a result of external influences, for example.

The fastening means are preferably selected from the group consisting of binders, clamping means, adhesives, magnetic means and/or mechanically acting touch-and-close fastening means. All these fastening means ensure in a simple manner the secure fastening of a positive pole or negative pole plug fastened on the spacer.

The fastening means are preferably designed to be permanently UV-stable, i.e. to be UV-stable over years and decades. This prevents the fastening means from degenerating during use in the field under the influence of UV light contained in the sunlight in such a way that they lose their function completely or to a significant extent. The fastening means are preferably made of plastic. The spacer is preferably likewise made of plastic.

The fastening means are preferably designed as UV-stable binders. In the sense according to the invention, a binder is to be understood as a means which binds the plug securely to the spacer in a structural manner. Furthermore, in addition to the fastening effect, the binders ensure that the spacer retains its shape permanently. The fastening means are more preferably designed as a cable tie. The cable ties allow simple, fast and permanent fastening of the plug connection of negative pole plug and positive pole plug on the spacer. Moreover, cable ties are small and handy, are very inexpensive as a mass-produced product and require little space in the kit of parts and can therefore be packaged easily.

In a further preferred embodiment, the first flat part and the fastening means for the plug connection are of integral design. As an alternative or in addition, the further flat part and the fastening means for the plug connection are of integral design. It is thereby possible to dispense with a further component.

The first flat part preferably has at least one cutout, which extends in the first flat part plane. As an alternative or in addition, the further flat part has at least one further cutout, which extends in the further flat part plane. Each cutout is preferably designed as an opening in the associated plane of the flat part. It is thereby possible to save on material and further production costs.

The invention furthermore relates to a method for producing a solar module system, comprising the following steps:

providing a plurality of kits of parts in accordance with one or more of the embodiments described above, assembling the first flat part with the further flat part using the fixing means and/or the further fixing means to produce an assembled spacer in such a way that the first flat part plane is arranged at a fixing angle to the further flat part plane and forms a plug recess, which is at a distance from the first flat part outer edges and the further flat part outer edges, between the first flat part plane and the further flat part plane, connecting the positive pole plug of one of the solar modules to a further negative pole plug of one of the further solar modules, thus forming a plug connection, arranging the positive pole plug and the further negative pole plug in the plug recess on the assembled spacer, and arranging the assembled spacer on an underlying surface, on which the solar modules also stand.

The method can be carried out in a simple manner on site in the field. The spacer can be packaged in an easy and simple manner and has little weight compared to the solar module. The spacer is therefore easy to transport and simple to assemble on site. No tools whatsoever are preferably required for assembling the spacer.

After the kit of parts has been provided, the further method steps can be carried out in any sequence. The statements described above with respect to the kit of parts apply correspondingly to the method for producing a solar module system, and vice versa.

The step of assembling the first flat part with the further flat part using the fixing means and/or the further fixing means is preferably carried out by inserting the first flat part into the further fixing means in the form of a slot and/or by inserting the further flat part into the fixing means in the form of a slot.

In a preferred embodiment, the method furthermore comprises the step of fastening the positive pole plug and/or the further negative pole plug on the spacer by means of fastening means. Here, therefore, the fastening means are designed as a separate component which is used in the production of the solar module system.

The invention furthermore relates to a use of a spacer in a solar module system to hold a plug connection at a predetermined distance from an underlying surface, wherein the spacer has a first flat part, which spans a first flat part plane with first flat part outer edges, and a further flat part, which spans a further flat part plane with further flat part outer edges. Furthermore, the first flat part and/or the further flat part have/has fixing means, the first flat part and the further flat part can be mounted on one another in such a way by the fixing means that the first flat part plane is arranged at a fixing angle to the further flat part plane and a plug recess which is at a distance from the first flat part outer edges and the further flat part outer edges is formed between the first flat part plane and the further flat part plane.

The statements described with respect to the kit of parts for a solar module system and with respect to the production method for a solar module system apply correspondingly to the use according to the invention, and vice versa.

In a preferred embodiment of the use, the solar module system comprises a solar module having a positive pole cable with a positive pole plug, and having a negative pole cable with a negative pole plug, and a further solar module having a further positive pole cable with a further positive pole plug, and having a further negative pole cable with a further negative pole plug. The spacer is used for arranging the plug connection between the positive pole plug and the further negative pole plug, or between the negative pole plug and the further positive pole plug, on the spacer, so that the predetermined distance between the plug connection and the underlying surface is ensured by the spacer.

The solar module system is preferably designed as a flat roof system, i.e. it is a solar module system to be mounted on a flat roof.

BRIEF DESCRIPTION OF THE DRAWINGS

A preferred exemplary embodiment of the invention is illustrated by way of example in the figures and is described in greater detail below. In the figures, which are purely schematic and not to scale.

DETAILED DESCRIPTION

Figure 1:
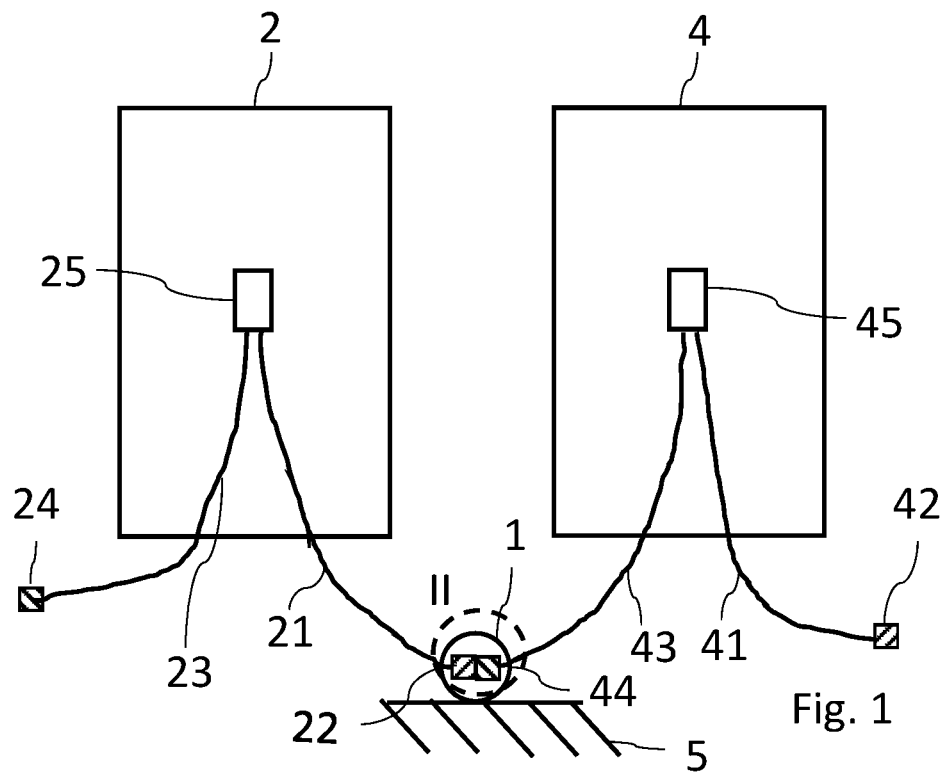
FIG. 1 shows a plan view of a use of a spacer in a solar module system.

FIG. 1 shows a plan view of a use of a spacer 1 in a solar module system. The solar module system comprises a solar module 2 having a positive pole cable 21 with a positive pole plug 22, and having a negative pole cable 23 with a negative pole plug 24, and a further solar module 4 having a positive pole cable 41 with a positive pole plug 42, and having a negative pole cable 43 with a negative pole plug 44. The positive pole plug 22 of the solar module 2 and the negative pole plug 44 of the further solar module 4 are connected to one another and arranged on the spacer 1, which ensures a predetermined distance between the plugs 22, 44 and an underlying surface 5 on which the solar modules 2, 4 stand and the spacer 1 comes to lie.

Figure 2:
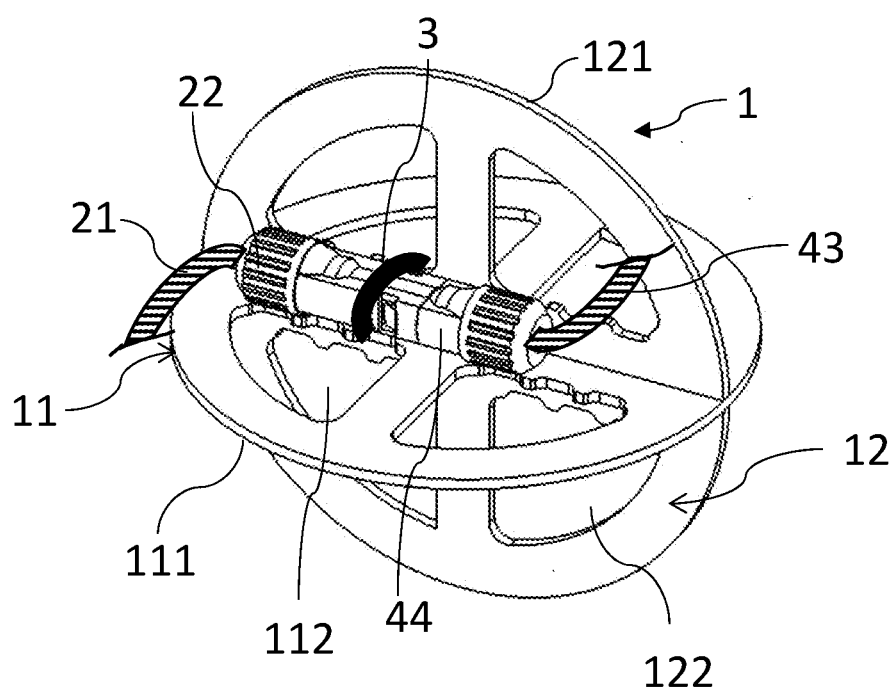
FIG. 2 shows an enlarged partial perspective view of the spacer shown in FIG. 1.

FIG. 2 shows an enlarged partial perspective view of the spacer 1 shown only in a purely schematic way in FIG. 1. The partial view shown in FIG. 2 is marked II in FIG. 1.

The positive pole plug 22, which forms one end of the positive pole cable 21, and the further negative pole plug 44, which forms one end of the further negative pole cable 43, are arranged and connected to one another on the spacer 1, such that an electrical plug connection which is intended is formed.

The spacer 1 has a first flat part 11 and a further flat part 12. The first flat part 11 spans a first flat part plane with first flat part outer edges 111, and the further flat part 12 spans a further flat part plane with further flat part outer edges 121. The first flat part 11 and the further flat part 12 are mounted on one another, by means of fixing means which cannot be seen here, in such a way that the first flat part plane is arranged at a fixing angle of approximately 90° to the further flat part plane and a plug recess (not shown), which is at a distance from the first flat part outer edges 111 and the further flat part outer edges 121, is formed between the first flat part plane and the further flat part plane. When the first flat part outer edges 111 and the further flat part outer edges 121 are joined in the imagination, the spacer 1 has a spherical outer contour.

The first flat part 11 has, purely by way of example, four cutouts 112 in the form of openings, which cutouts extend in the first flat part plane, while the further flat part 12 likewise has, purely by way of example, four further cutouts 122 in the form of openings, which cutouts extend in the further flat part plane.

The positive pole plug 22 and the further negative pole plug 44 form a plug connection and are arranged in a plug recess. This plug recess is formed between the first flat part 11 and the further flat part 12, which are fixed on one another with the aid of their fixing means. The plugs 22, 44 forming the plug connection are fastened on the spacer 1 at the position of the plug recess by means of fastening means 3 in the form of a cable tie.

Figure 3:
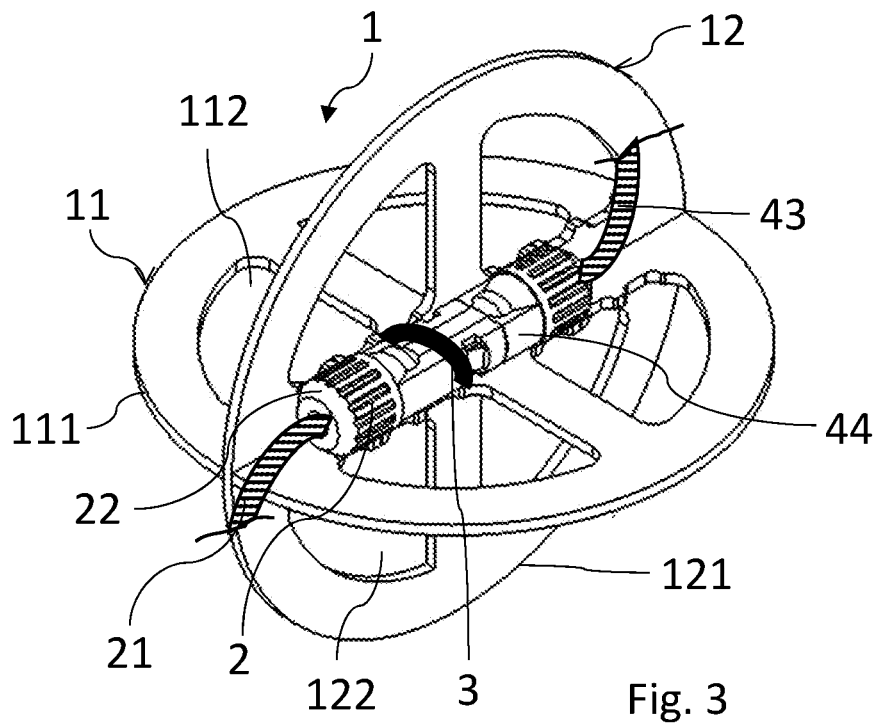
FIG. 3 shows a further perspective illustration of the spacer shown in FIG. 2.

FIG. 3 shows a further perspective view of the spacer shown in FIG. 2. The spacer 1 has the spherical outer contour, and therefore, even when there is movement, it ensures that the plugs 22, 44 come to rest at the predetermined distance from the underlying surface (not shown).

Moreover, it can be seen, when FIGS. 2 and 3 are viewed together, that the first flat part 11 and the further flat part 12 are of identical design.

Figure 4:
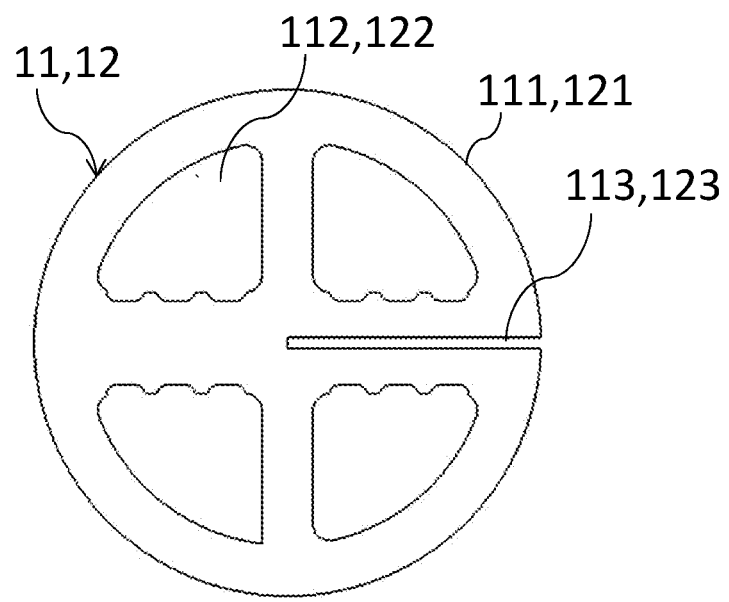
FIG. 4 shows a plan view of a first flat part of the spacer shown in FIGS. 1 to 3.

FIG. 4 shows a plan view of the first flat part and of the further flat part 12 of the spacer shown in FIGS. 1 to 3. Since the first flat part 11 and the further flat part 12 are preferably of identical design, the reference symbols of the respective component features will be mentioned twice below. The first flat part 11/the further flat part 12 spans the first flat part plane/the further flat part plane with the first flat part outer edges 111/further flat part outer edges 121. Furthermore, it has fixing means (also referred to as connecting structure) 113/further fixing means (also referred to as further connecting structure) 123 in the form of a slot. This slot 113, 123 is designed in such a way that it fits around a section of the respectively corresponding flat part (not shown) in an assembled state of the spacer. Furthermore, the first flat part 11/the further flat part 12 is of axially symmetrical design in its first flat part plane/its further flat part plane along the slot-shaped first fixing means 113/further fixing means 123.

Figure 5:
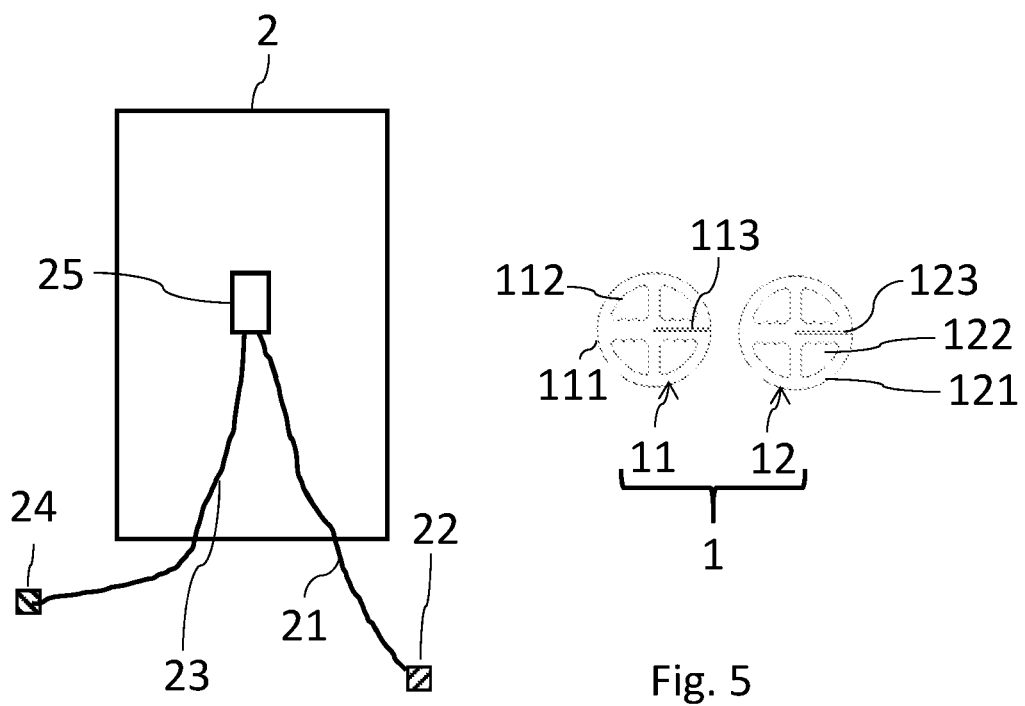
FIG. 5 shows a plan view of a kit of parts according to the invention for a solar module system.

FIG. 5 shows a plan view of a kit of parts according to the invention. The kit of parts has a solar module 2 and a spacer 1. The solar module 2 has a junction box 25, a positive pole cable 21 with a positive pole plug 22, and a negative pole cable 23 with a negative pole plug 24. The positive pole cable 21 and the negative pole cable 23 are each connected at one end to the junction box 25 and have the positive pole plug 22 and the negative pole plug 24, respectively, at their other end. Here, the spacer 1 is shown with its individual components in a form which has not yet been assembled. It has a first flat part 11 and a further flat part 12. The first flat part 11 spans a first flat part plane with first flat part outer edges 111. Purely by way of example, it has four cutouts 112 in the form of openings and fixing means 113 in the form of a slot. The further flat part 12 spans a further flat part plane with further flat part outer edges 121. Purely by way of example, it likewise has four cutouts 122 in the form of openings and further fixing means 123 in the form of a slot. The first flat part 11 and the further flat part 12 are of identical design. The spacer 1 can be assembled by introducing and/or inserting a section of the first flat part 11 into slot 123 and simultaneously introducing and/or inserting a section of the further flat part 12 into slot 113.

FIGS. 6a to 6e show a method according to the invention for producing a solar module system, in each case plan views of kits of parts being shown.

Figure 6A:
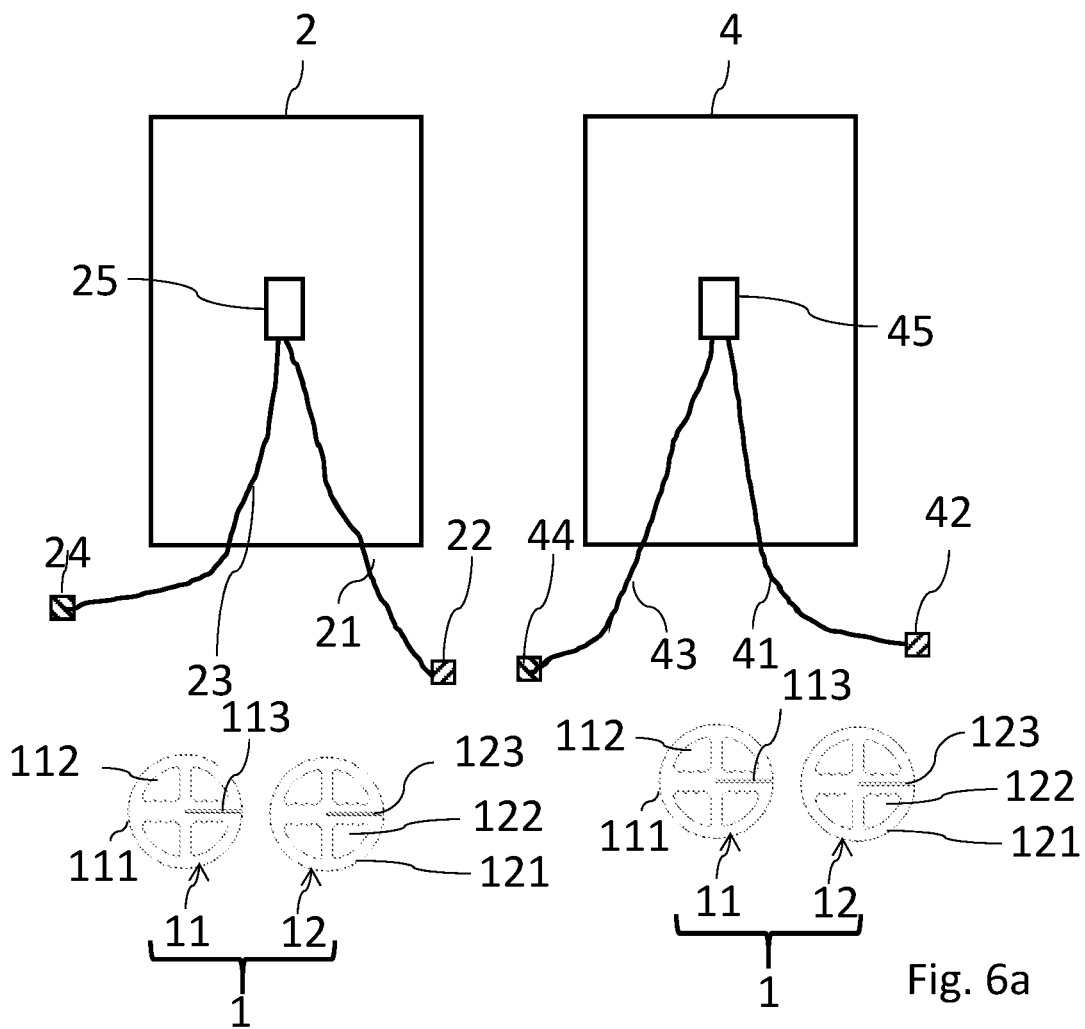
FIGS. 6a to 6e show the method steps of a method according to the invention for producing a solar module system.

FIG. 6a shows one step of the provision of two kits of parts, each corresponding to the kit of parts shown in FIG. 5. The one kit of parts has a solar module 2 and an unassembled spacer 1, while the other kit of parts has a further solar module 4 and a further spacer 1. Solar module 2 has a junction box 25, which is connected by a positive pole cable 21 to a positive pole plug 22 and by a negative pole cable 23 to a negative pole plug 24, while solar module 4 has a junction box 45, which is connected by a positive pole cable 21 to a positive pole plug 42 and by a negative pole cable 43 to a negative pole plug 44.

The spacers 1 correspond to the spacer 1 shown in FIG. 5. Each of FIGS. 6b to 6e shows only one spacer 1, while the further spacer 1 is omitted below for the sake of clarity.

Figure 6B:
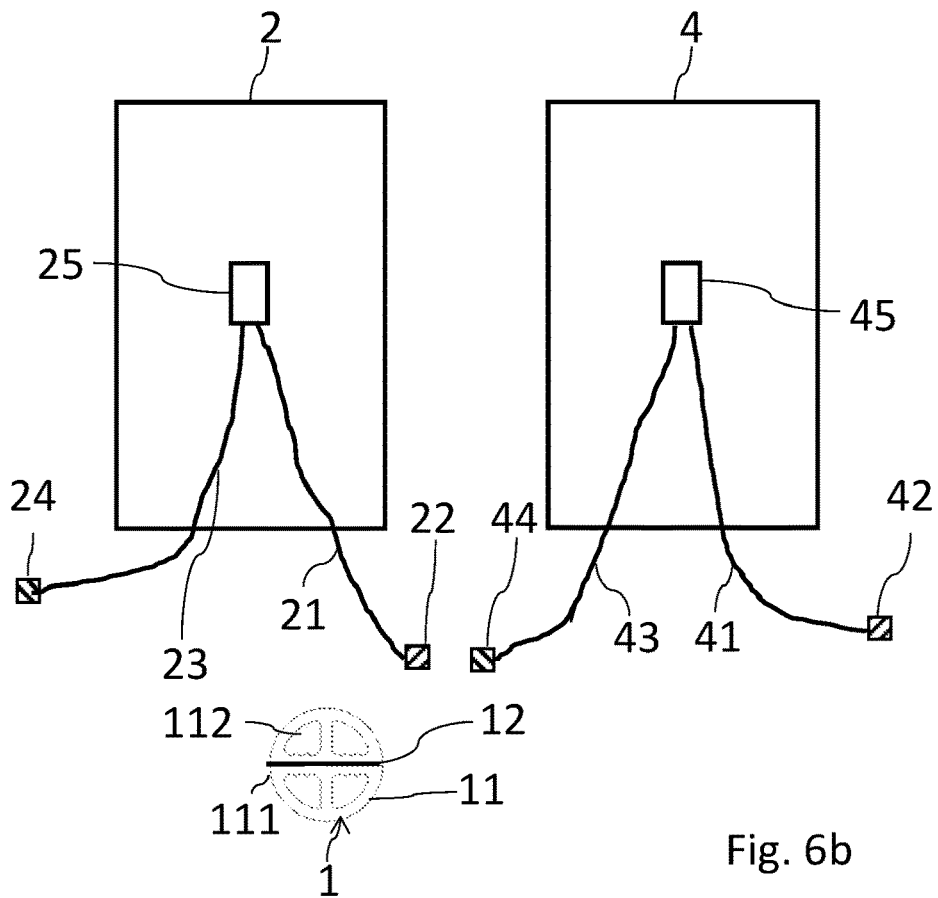

FIG. 6b shows a further step of the assembly of the first flat part 11 with the further flat part 12 using the fixing means 113 and the further fixing means 123 to produce an assembled spacer 1 in such a way that the first flat part plane is arranged at a fixing angle of 90° to the further flat part plane and forms a plug recess, which is at a distance from the first flat part outer edges 111 and the further flat part outer edges 121, between the first flat part plane and the further flat part plane.

Figure 6C:
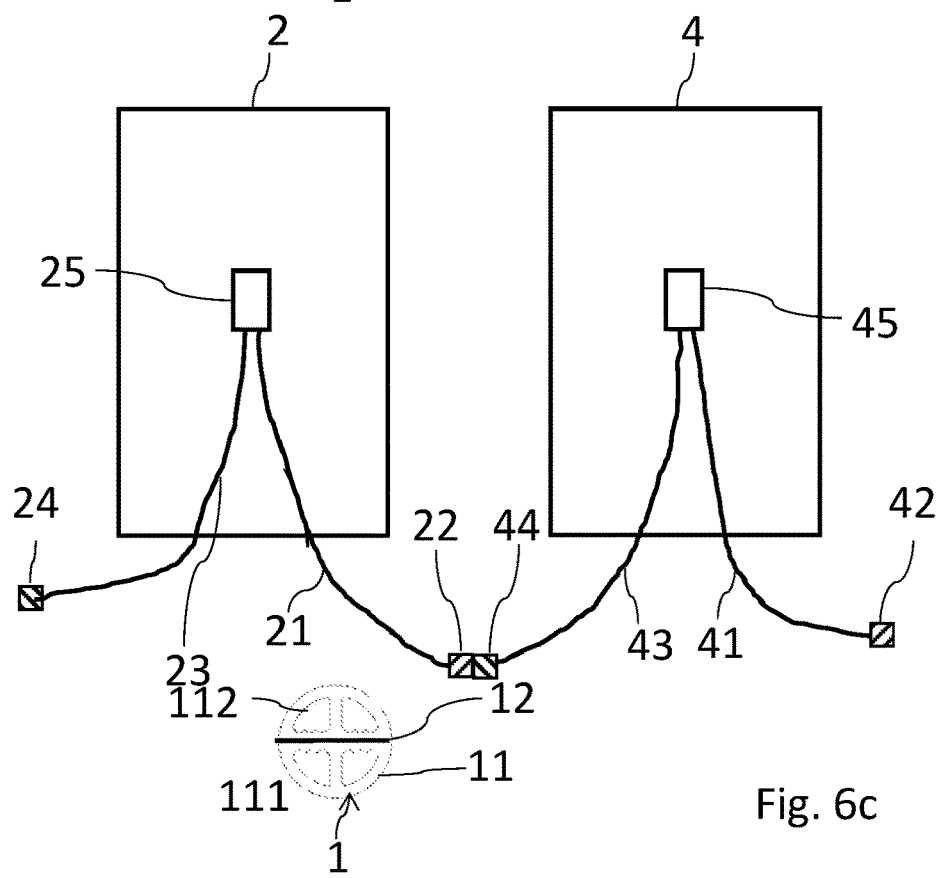

FIG. 6c shows a further step of connecting the positive pole plug 22 of solar module 2 to a further negative pole plug 44 of the further solar module 4, thus forming a plug connection.

Figure 6D:
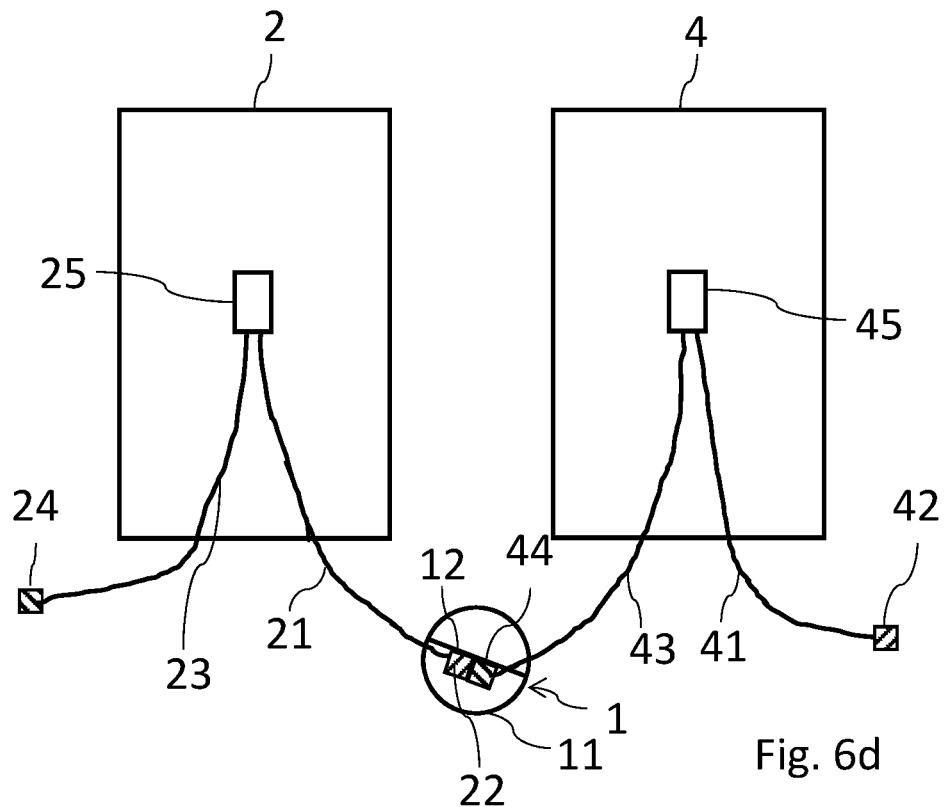

FIG. 6d shows a further step of arranging the positive pole plug 22 and the further negative pole plug 44 in the plug recess on the assembled spacer 1, and arranging the assembled spacer (1 on an underlying surface (not illustrated), on which the solar modules 2, 4 also stand. The respective cutouts of the flat parts 11, 12 are not shown for the sake of clarity.

Figure 6E:
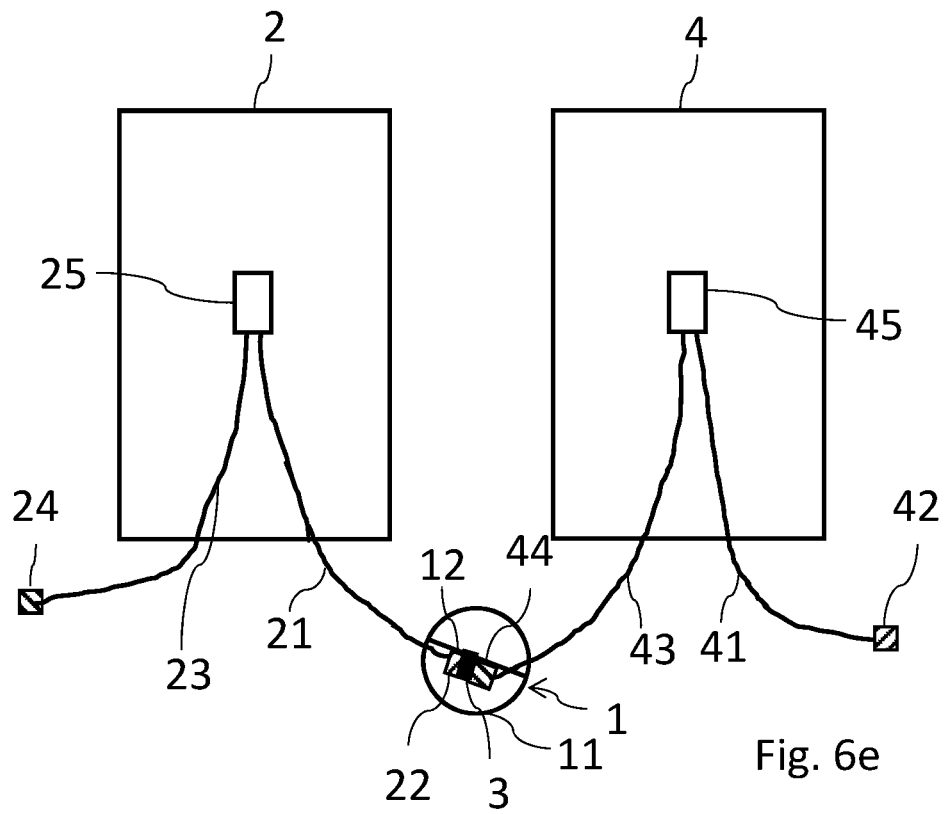

FIG. 6e shows a further step of permanently fastening the positive pole plug 22 and the further negative pole plug 44 on the spacer 1 by means of fastening means 3 in the form of a cable tie.

LIST OF REFERENCE SIGNS 1 spacer
11 first flat part
111 first flat part outer edge
112 cutout
113 fixing means
12 further flat part
121 further flat part outer edge
122 further cutout
123 further fixing means
2 solar module
21 positive pole cable
22 positive pole plug
23 negative pole cable
24 negative pole plug
25 junction box
3 fastening means
4 further solar module
41 further positive pole cable
42 further positive pole plug
43 further negative pole cable
44 further negative pole plug
45 further junction box
5 underlying surface

The invention claimed is:

1. A kit of parts for a solar module system, comprising
a solar module having a positive pole cable with a positive pole plug, and having a negative pole cable with a negative pole plug,
a spacer, wherein the spacer has a first flat part, which spans a first flat part plane with first flat part outer edges, and a further flat part, which spans a further flat part plane with further flat part outer edges,
wherein the first flat part has a first connecting structure and/or the further flat part has a further connecting structure, the first flat part and the further flat part can be mounted on one another in such a way that the first flat part plane is arranged at a fixing angle to the further flat part plane and a plug recess which is at a distance from the first flat part outer edges and the further flat part outer edges are formed between the first flat part plane and the further flat part plane; and
wherein the positive pole plug or the negative pole plug is arranged in the plug recess on the spacer.

2. The kit of parts as claimed in claim 1, wherein the fixing angle is in a range of from 75° to 90°.

3. The kit of parts as claimed in claim 2, wherein the fixing angle is in a range of from 80° to 90°.

4. The kit of parts as claimed in claim 3, wherein the fixing angle is in a range of from 85° to 90°.

5. The kit of parts as claimed in claim 1, wherein the first connecting structure and/or the further connecting structure are designed as mechanical connecting structures.

6. The kit of parts as claimed in claim 5, wherein the first connecting structure of the first flat part is designed as a slot which is designed in such a way that it fits around a section of the further flat part in an assembled state of the spacer, and/or the further connecting structure of the further flat part is designed as a slot which is designed in such a way that it fits around a section of the first flat part in an assembled state of the spacer.

7. The kit of parts as claimed in claim 1, wherein the flat part and the further flat part are of identical design.

8. The kit of parts as claimed in claim 1, wherein the first flat part is of axially symmetrical design in its first flat part plane and/or the further flat part is of axially symmetrical design in its further flat part plane.

9. The kit of parts as claimed in claim 1, further comprising a fastening structure designed to fasten the positive pole plug or the negative pole plug on the spacer in a state in which said fastening structure is fastened on the spacer.

10. The kit of parts as claimed in claim 9, wherein the fastening structure is selected from the group consisting of UV-stable binders, UV-stable clamping means, adhesives, magnetic means and/or mechanically acting touch-and-close fastening means.

11. The kit of parts as claimed in claim 9, wherein the fastening structure is designed as a cable tie.

12. The kit of parts as claimed in claim 9, wherein the first flat part and the fastening structure are of integral design and/or the further flat part and the fastening structure are of integral design.

13. The kit of parts as claimed in claim 1, wherein the first flat part has at least one cutout, which extends in the first flat part plane, and/or the further flat part has at least one further cutout, which extends in the further flat part plane.

14. A method for producing a solar module system, comprising the following steps:
    providing a plurality of kits of parts as claimed in claim 1,
    assembling the first flat part with the further flat part using the first connecting structure and/or the further connecting structure to produce an assembled spacer in such a way that the first flat part plane is arranged at a fixing angle to the further flat part plane and forms a plug recess, which is at a distance from the first flat part outer edges and the further flat part outer edges, between the first flat part plane and the further flat part plane,
    connecting the positive pole plug of one of the solar modules to a further negative pole plug of one of the further solar modules, thus forming a plug connection,
    arranging the positive pole plug and the further negative pole plug in the plug recess on the assembled spacer, and
    arranging the assembled spacer on an underlying surface, on which the solar modules also stand.

15. The method as claimed in claim 14, further comprising a step of fastening the positive pole plug and/or wherein the further negative pole plug on the spacer includes fastening the positive pole plug and/or the further negative pole on the spacer with a fastening structure.

16. A method of using a spacer in a solar module system having a solar module for holding a plug connection at a predetermined distance from an underlying surface, wherein the spacer has a first flat part, which spans a first flat part plane with first flat part outer edges, and a further flat part, which spans a further flat part plane with further flat part outer edges, and wherein the first flat part and/or the further flat part have/has a first connecting structure, the method comprising:
    mounting the first flat part and the further flat part on one another in such a way that the first flat part plane is arranged at a fixing angle to the further flat part plane and a plug recess which is at a distance from the first flat part outer edges and the further flat part outer edges is formed between the first flat part plane and the further flat part plane; and
    arranging a positive pole plug of the solar module or a negative pole plug of the solar module in the plug recess on the assembled spacer.

17. The method as claimed in claim 16, wherein the solar module includes a positive pole cable with the positive pole plug, and a negative pole cable with the negative pole plug, and the solar module system further comprises a further solar module having a further positive pole cable with a further positive pole plug, and having a further negative pole cable with a further negative pole plug, and the spacer is used for arranging the plug connection between the positive pole plug with the further negative pole plug, or between the negative pole plug with the further positive pole plug, on the spacer, the predetermined distance between the plug connection and the underlying surface thus being ensured by the spacer.

* * * * *